June 23, 1936.  W. W. HAMILL  2,045,227
SHOCK ABSORBING STEERING WHEEL FOR AUTOMOBILES
Filed Jan. 10, 1935  2 Sheets-Sheet 1
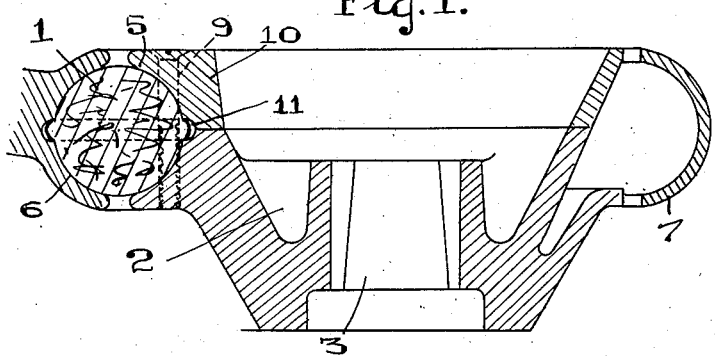
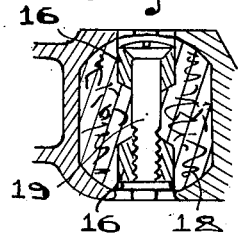
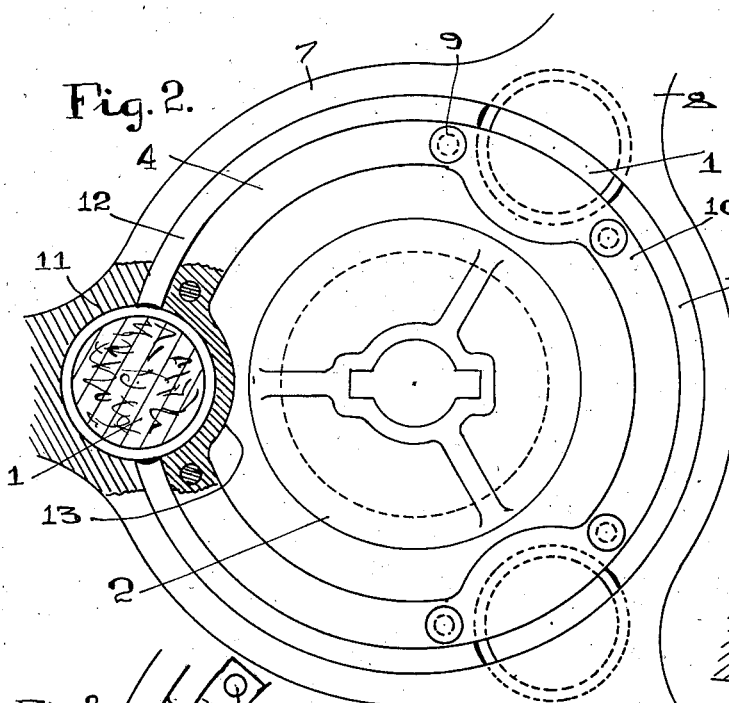
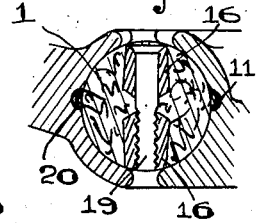
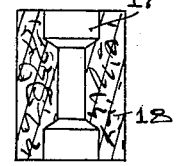
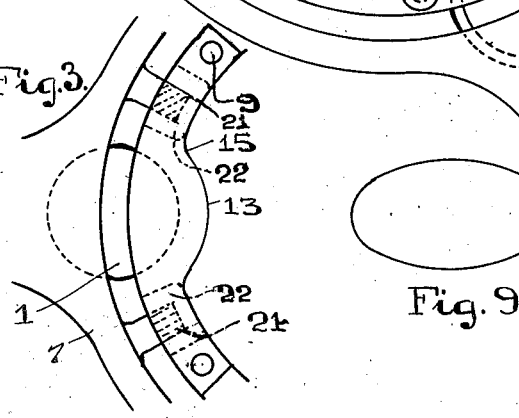
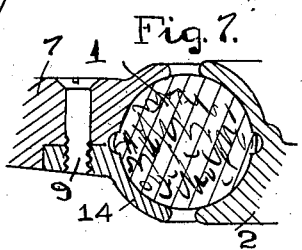
Inventor
William W. Hamill
by
William A. Davis
Attorney.

June 23, 1936.  W. W. HAMILL  2,045,227
SHOCK ABSORBING STEERING WHEEL FOR AUTOMOBILES
Filed Jan. 10, 1935     2 Sheets-Sheet 2
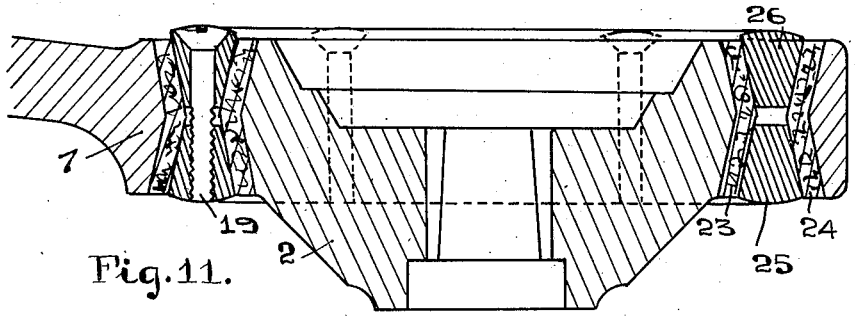
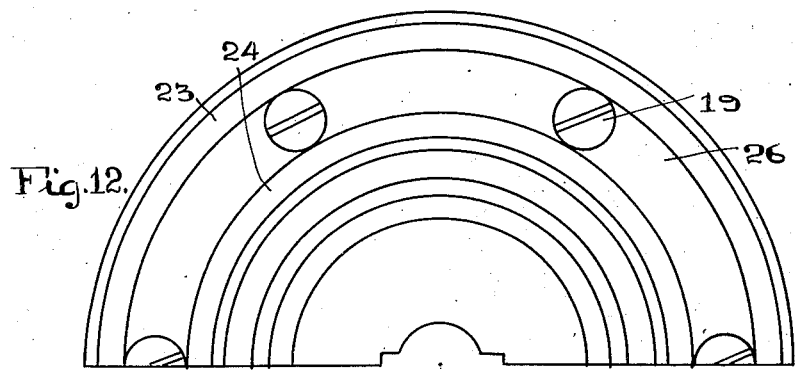
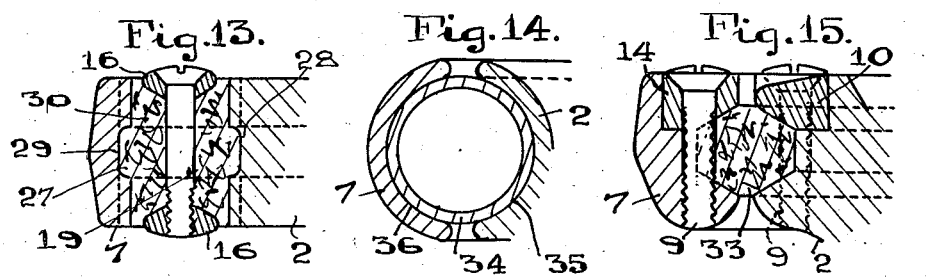
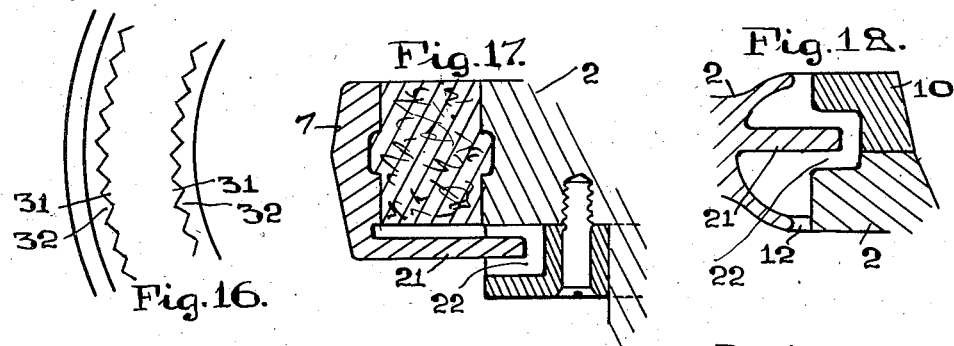
Inventor
William W. Hamill
by
William A. Davis
Attorney.

Patented June 23, 1936

2,045,227

UNITED STATES PATENT OFFICE 2,045,227

SHOCK-ABSORBING STEERING WHEEL FOR AUTOMOBILES

William Wilson Hamill, Four Oaks, England

Application January 10, 1935, Serial No. 1,113
In Great Britain January 16, 1934

4 Claims. (Cl. 74—552)

This invention relates to steering wheels for self-propelled vehicles by which the vehicle is manually guided and controlled, and more particularly those wheels in which there is interposed between the steering column or a part fixed thereto and the hub of the steering wheel material such as rubber to mitigate the effects of vibration and noise originating in the power unit and the chassis, and the effects of road impacts during travel.

The object of the invention is the provision of a shock-absorbing steering wheel in which metallic continuity between the steering column and the steering wheel is broken; which allows the steering wheel a limited amount of universal movement in relation to the steering column; which absorbs vibration and shock in a rotational direction and in an axial direction; which if desired allows the flexibility of the connecting medium to be varied and regulated; which can yield and afford a measure of protection to the driver in case of collision; and which presents a simple manufacturing proposition.

Having the aforesaid and other objects in view as will appear from a perusal of the following specification, the invention consists in a steering wheel comprising a steering column member having a plurality of peripheral depressions, an outer steering wheel member having an annular hub which surrounds the steering column member and which has a plurality of depressions in its bore, and a plurality of rubber elements housed within said depressions.

In the accompanying drawings illustrating the invention, Figure 1 is a sectional elevation of the hub of a steering wheel according to the invention, the rim and spokes not being shown as they are of known construction.

Figure 2 is a plan view of Figure 1 with one part sectionalized.

Figure 3 is a fragmentary plan view showing a removable segment for compressing one of the rubber elements.

Figure 4 shows a modification in which the elastic element is of cylindrical cross-section, with means for enlarging the outside diameter of the element.

Figure 5 is a similar view to Figure 4 but includes a spheroidal element.

Figure 6 shows the elastic element of Figure 4 before enlargement by the expanding means.

Figure 7 is a fragmentary view which indicates the manner in which the rubber element can be held by a removable part of the steering wheel hub.

Figure 8 is a plan of Figure 6.

Figure 9 illustrates an ovoid form of rubber element, and Figure 10 is a cross-sectional end view of Figure 9.

Figure 11 is a cross-sectional view of a steering wheel centre in which the elastic medium takes the form of continuous annuli.

Figure 12 is a half plan of Figure 11.

Figure 13 is a fragmentary sectional view of a modification in which a single rubber annulus is used.

Figure 14 shows cross-sectionally an annulus which is inflatable by internal gas or air pressure.

Figure 15 shows in cross-section a form of the invention embodying a single rubber annulus and removable parts of the steering wheel hub and the steering column part, by which the annulus is held and which permits of variation in the compression pressure applied to the rubber annulus.

Figure 16 is a fragmentary plan view illustrating a toothed formation of the periphery and bore of the rubber annulus, and of the surfaces engaged thereby, which formation is applicable to any of the annuli illustrated in Figure 11, 13, or 15.

Figures 17 and 18 illustrate sectionally projections and recesses in the two connected parts of the wheel, which limit the yield of the rubber medium, and ensure a coupling in case of failure of the rubber part or parts.

In the various embodiments illustrated, a plurality of separate rubber elements or one or more continuous rubber annuli are employed as a resilient medium to connect the two parts of the wheel, that is, the part fixed to the steering column to the annular hub of the steering wheel proper. The elastic elements are of any suitable cross-section and configuration, round, square, rectangular, diamond, spherical, ovoid, or other shaped pieces being arranged with one part in the steering wheel hub and one part in the steering column member, suitable recesses or depressions being provided to receive them. The annular hub of the steering wheel is enlarged to surround the central steering column member with sufficient clearance to allow full relative movement of the connected parts without contact under normal conditions.

Since the recesses or depressions in which the elements are housed are deep enough to prevent separation of the connected parts, means are provided by which the recesses are accessible for insertion or removal of the rubber elements, and various constructions are illustrated with this object in view.

In Figures 1 and 2, the rubber elements 1 are of spherical shape housed in recesses approximating to hemi-spherical cavities. The steering column part 2 is keyed to the steering column in known manner by a boss 3 which is branched outwardly and upwardly in the form of a ring 4. At suitable distances around the periphery of this ring are formed a number of cavities 5 corresponding in number to the elements it is desired to include. Any desired number of elements may be included, but three is generally sufficient. The configuration of such cavities corresponds approximately to that of the part of the element which seats therein, although as will be indicated later, the high degree of elastic flow of the rubber allows the configuration of the cavity to differ from that of the element before insertion. Similar hemi-spherical cavities 6 are formed in the bore of the steering wheel hub 7, which is a cylindrical annulus with spokes 8 for coupling to the rim not shown. For compactness, said cavities 6 are situated in the regions where the spokes join the hub 7.

In the construction shown in Figures 1 and 2, the steering column part 2 is built up in two sections bolted together by setscrews 9 and abut at about the median transverse plane of the rubber balls. The upper detachable ring 10 and the lower ring have quadrispherical cavities which when brought together by means of the screws 9 exert some measure of compression on the balls, a groove 11 being formed where the rings meet to allow them to be screwed down solid and abut, without trapping the middle of the balls.

One of the features of the invention which has a number of advantages in practice is the provision of adjusting means by which the resistance of the resilient medium to displacement and deformation for a given load can be varied, imparting to the support controlled flexibility, apart from changing the rubber elements. A greater range of conditions can thus be met with a standardized product, such as occur for example on touring cars, sports cars, and commercial vehicles, while it is possible for the driver to vary the yield according to his particular needs or to the kind of terrain in which the vehicle is used. The amount of compression applied to the rubber will depend upon the distance apart of the two rings, in turn determined by the setscrews 9. By suitably adjusting the screws, the resistance of the wheel to relative movement for given rubber elements can be changed. Clearance 12 is left between the periphery of the steering column part 2 and the encircling steering wheel hub 7 to provide for sufficient yield without contact, and bulges 13 on said part 2 allow the overall diameter of the hub 7 to be kept as small as practicable.

The relatively-movable part for varying the compression applied to the rubber may be incorporated with the steering wheel hub instead of or in addition to the provision on the steering column part, such an arrangement being illustrated in Figure 7 wherein the inner ring 2 is made in a single part and the steering wheel hub has an adjustable and detachable ring 14 formed with quadri-cavities for the rubber elements and held by screws 9 to the hub 7.

According to another variation, the cavital parts are made as separate segments 15, Figure 3, held by screws 9 to the steering column hub. Each segment includes a quadrispherical cavity, and all the rubber elements may be compressible in this way or say two movable segments may be used with one non-adjustable fixing.

In a further development of the invention, the elastic elements are expanded against the cavity walls after being placed in the cavities, providing both a means of fixing and adjustment for yield. A construction of this character is shown in Figures 4 and 5. Therein means for enlarging the rubber elements in one direction by compressing them in another direction are illustrated applied to a single element which may be of any suitable shape; in Figure 4, the elastic body is circular in cross-section while in Figure 5 it is spheroidal. The means of compression comprise two metal parts 16 embedded in rebates 17 (see Figure 6) in the rubber element in axial alignment, one of the metal parts being tapped and the other counterbored to form a seat for the head of the compressing screw 19. As will be apparent from Figure 6, the rubber sleeve 18 is longer axially in the free state than when compressed axially as in Figure 4. From the illustrations, it will be seen that the rubber elements are placed loosely in the half cavities in the bore of the steering wheel hub and the steering column part, and then the compressing screw 19 is turned to cause the metal bushes 16 mutually to approach. Rubber being substantially incompressible, it follows that the rubber elements are enlarged in outside diameter until the cavities are filled, further progress of the screw increasing the pressure within the rubber and its resistance to deformation. By this means, the yield for given load can be varied by a simple movement. Means for enlarging the rubber elements in the manner described can be applied to the other embodiments illustrated where a movable ring or segments are employed.

The shape and cross-section of the elastic elements may as before mentioned be varied, and in Figures 9 and 10 an element of ovoid configuration and circular cross-section is illustrated, the major axis being either radial, parallel to the axis of the wheel, or tangential to a radius, when in position.

Where the element is of a shape which would allow the element to work round or shift in its cavity and prevent access to the compressing screw as in Figure 5, such movement may be inhibited by the provision of a peripheral flange 20 moulded around the middle of the rubber ball 1 to register with a groove turned in the two hemispherical parts of the cavity.

To limit the stress applied to the rubber elements, projections 21, Figures 17 and 18, are formed to extend radially from the steering wheel hub to span the clearance space 12 into rebates 22 in the steering column member at positions intermediate to and adjacent to the rubber elements, said projections being normally clear of the surrounding walls of the rebates; if however unusually high stress is applied to the elastic elements, the projections or one of them come into contact with some part of the surrounding walls of the rebate or rebates and are thereby stopped from further movement so as to limit the amount of yield either in a rotational direction or up and down. This stop action has a further use, to prevent separation of the steering wheel member and the steering column member, and enable steering control to be retained in case of shearing of the rubber elements, torque being transmitted through the stops instead of through the rubber. It should be observed that such limiting stops are usable with the constructions embodying two separable parts for the steering wheel member or the column member, which allow the projections to be placed in the rebates and the structure then closed by the subsidiary ring or segments.

Other forms of the invention include an elastic element of annular configuration which forms the driving connection between the steering wheel proper and the steering column, allows limited universal movement between the two connected members, and is combined with means for subjecting it to compression. In Figure 11, the rubber annulus is in two sections, an inner ring 23 and an outer ring 24 separated by a pair of wedge-section metal compressing rings 25, 26 which can be drawn towards one another by screws 19 tapped into one of the rings and bearing on the other. As in the group of embodiments before-described, the steering wheel hub encircles the steering column member but in this case, the annular interspace is filled by the elastic annuli one of which is forced outwardly and the other forced inwardly when the screws 19 are advanced as will be clear from the drawings. The rubber annuli can have a cross-section in the free state approximating to the cross-section shown, that is, a shallow V, or they can have a rectangular cross-section, but by the presence of the constriction in the middle, they hold the two connected parts together in an axial direction.

A parallel-sided elastic annulus is indicated in Figures 13 and 16 provided with an enlarged belt 27 at the middle of its bore and of its periphery to mate with grooves 28, 29 turned or cast in the periphery of the steering column member 2 and in the bore of the outer member 7, in order to hold the two members axially. The elastic annulus 30 is provided with means by which it can be expanded against the confining surfaces of the two members, said means being similar to those shown in Figure 4 and consisting of compressing screws 19 and end abutments 16 one of which is tapped to receive its respective screw. The contact faces of the two abutments are sloped to increase radial pressure on the rubber in the outer regions in the vicinity of the abutments. By varying the angle of the contact faces, the radial pressure distribution can be varied and controlled as desired, concave abutments resulting in delayed expansion and convex abutments prior expansion of the outer facial regions of the elastic annulus. Torsion stresses are transmitted to or from the rubber annulus by V-shaped teeth 31 moulded in its bore and on its periphery to engage similar teeth 32 on the periphery of the steering column member and in the bore of the steering wheel hub.

As with the constructions having a number of separate elastic elements, the steering column member or the steering wheel member may be made in two separable sections bolted together to complete the cavity in which the rubber part is housed. As shown in Figure 15 the rubber annulus 33 is a hexagon or octagon in cross-section. The steering column member 2 has a two-sided peripheral groove closed as to its third and upper face by the loose ring 10 and screws 9.

Alternatively or additionally, the steering wheel hub 7 which encircles the member 2 is provided with the detachable ring 14 and associated screws 9, which like the ring 10 is employed to vary the compression pressure applied to the rubber and the resistance of the latter to movement for a given force.

In Figure 14 internal fluid pressure is utilized as the agent for holding the rubber annulus against the two connected members, which arrangement permits of a very simple construction in which also the resistance to yield can be varied in an exceedingly convenient manner. The circular section air tube 34 is interposed between the two spaced members the inner of which has a peripheral groove 35 of half round section and the outer has a similar grove 36 in its bore. The air tube, provided with a suitable valve, is inserted in place and inflated to the required pressure, the higher the pressure, the greater the resistance of the rubber tube to yielding for given load.

By the word rubber used herein is meant compositions used commercially and containing various kinds and proportions of drugs, fillers, compounds, and the like for varying the characteristics and cost of the vulcanized rubber.

Having described my invention, what I claim is:

1. A steering wheel including a steering column member formed at spaced intervals with depressions, an outer steering wheel member including a rigid element to be arranged in the plane of the steering column member and spaced therefrom, the steering wheel member being formed with spaced depressions similar in size and shape to the depressions in the steering column member, a plurality of substantially solid elastic elements designed to fit snugly said registering depressions in the steering column member and steering wheel member, the cooperation of said elastic elements and the walls of the depressions providing a rigid nonyielding confinement of the elastic elements except in the area bridging the space between the steering column member and the steering wheel member, and means for compressing the elastic elements to increase the resistance to deformation, thereby to avoid any feeling of slackness between the steering column member and the steering wheel member during use and insure requisite firmness in the connection.

2. A construction as defined in claim 1, wherein the depressions in the steering column member and in the steering wheel member are substantially segment of a sphere and wherein the elastic members are substantially spherical.

3. A construction as defined in claim 1, wherein the means for compressing the elastic elements is operable from the exterior of the steering column member.

4. A construction as defined in claim 1, wherein the means for compressing the elastic elements involves the physical adjustment of the volume of the depressions.

WILLIAM WILSON HAMILL.